United States Patent
Tsai et al.

(10) Patent No.: US 12,327,051 B2
(45) Date of Patent: Jun. 10, 2025

(54) FLASH MEMORY CONTROLLER AND ASSOCIATED CONTROL METHOD

(71) Applicant: Silicon Motion, Inc., Hsinchu County (TW)

(72) Inventors: Ming-Yu Tsai, Taipei (TW); Hong-Ren Fang, Hsinchu County (TW); Hsin-Ying Teng, Taipei (TW); Shih-Min Yen, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/623,061

(22) Filed: Apr. 1, 2024

(65) Prior Publication Data
US 2024/0377989 A1    Nov. 14, 2024

(30) Foreign Application Priority Data
May 12, 2023   (TW) ................. 112117725

(51) Int. Cl.
*G06F 3/06* (2006.01)
(52) U.S. Cl.
CPC .......... *G06F 3/0659* (2013.01); *G06F 3/0613* (2013.01); *G06F 3/0679* (2013.01)
(58) Field of Classification Search
CPC .... G06F 3/0659; G06F 3/0613; G06F 3/0679; G06F 3/061; G06F 13/1668; G06F 13/382
See application file for complete search history.

(56) References Cited

U.S. PATENT DOCUMENTS

| 2004/0193834 A1* | 9/2004 | Emberling .......... G06F 13/4243 711/213 |
| 2008/0016254 A1* | 1/2008 | Kruger ................ G06F 13/1657 709/251 |
| 2017/0075572 A1* | 3/2017 | Utevsky ................ G06F 3/0688 |

FOREIGN PATENT DOCUMENTS

| CN | 104281413 A | 1/2015 |
| CN | 114550777 A | 5/2022 |
| CN | 115427926 A | 12/2022 |

(Continued)

OTHER PUBLICATIONS

Lee, Minkyeong, et al. "Improving read performance by isolating multiple queues in NVMe SSDs." Proceedings of the 11th International Conference on Ubiquitous Information Management and Communication. 2017. (Year: 2017).*

*Primary Examiner* — Nicholas J Simonetti
(74) *Attorney, Agent, or Firm* — Winston Hsu

(57) ABSTRACT

The present invention provides a flash memory controller configured to access a flash memory module. The flash memory controller includes a transmission interface circuit, a buffer memory and a microprocessor. The transmission interface circuit is coupled to a host device, and the transmission interface circuit includes a time queue, at least one virtual queue and a command processing circuit, wherein the command processing circuit is configured to receive a plurality commands from a host device, write information of the plurality of commands into the time queue in sequence, and write the information of at least part of the plurality of commands into the at least one virtual queue. The buffer memory is configured to store the plurality of commands. The microprocessor is configured to selectively read the time queue or the at least one virtual queue to read the information of the plurality of commands.

16 Claims, 3 Drawing Sheets

(56) References Cited

FOREIGN PATENT DOCUMENTS

| TW | I640920 B | 11/2018 |
| TW | 202143046 A | 11/2021 |
| TW | 202147091 A | 12/2021 |

* cited by examiner

FLASH MEMORY CONTROLLER AND ASSOCIATED CONTROL METHOD

BACKGROUND OF THE INVENTION

1. Field of the Invention

The present invention relates to a flash memory controller.

2. Description of the Prior Art

In a conventional flash memory controller, at least one queue is usually designed to temporarily store multiple commands from a host device, for the processor inside the flash memory controller to process these commands in sequence.

In practice, in order to improve the efficiency of processing these commands, a read command queue, a write command queue and an other-command queue are usually set in the flash memory controller, wherein the read command queue is exclusively used to temporarily store read commands from the host device, the write command queue is exclusively used to temporarily store write commands from the host device, and the other-command queue is used to temporarily store all other commands except read commands and write commands. However, if the host device sends a specific command with high priority, according to the Universal Flash Storage (UFS) specification, the execution time of the specific command with high priority must be earlier than the execution time of the command issued subsequently. Therefore, the flash memory controller needs to read all commands in the read command queue, write command queue and other-command queue, and sorts these commands according to the received times to determine when the specific command with high priority will be executed. However, this approach will seriously affect the performance of the flash memory controller.

In addition, in the process of the flash memory controller reading all commands in the read command queue, write command queue and other-command queue and sorting them according to the received times, it is necessary to lock the front ends of the read command queue, write command queue and other-command queue to avoid continuously receiving commands from the host device and affecting related operations, but this will further reduce the performance of the flash memory controller.

SUMMARY OF THE INVENTION

It is therefore an objective of the present invention to provide a flash memory controller that uses a time queue and at least one virtual queue to perform the commands from the host device, to solve the above-mentioned problems.

According to one embodiment of the present invention, a flash memory controller configured to access a flash memory module is disclosed. The flash memory controller comprises a transmission interface circuit, a buffer memory and a microprocessor. The transmission interface circuit is coupled to a host device, and the transmission interface circuit comprises a time queue, at least one virtual queue and a command processing circuit, wherein the command processing circuit is configured to receive a plurality commands from a host device, write information of the plurality of commands into the time queue in sequence, and write the information of at least part of the plurality of commands into the at least one virtual queue. The buffer memory is configured to store the plurality of commands. The microprocessor is configured to selectively read the time queue or the at least one virtual queue to read the information of the plurality of commands.

According to one embodiment of the present invention, a control method of a flash memory controller comprises the steps of: setting a time queue and at least one virtual queue; receiving a plurality commands from a host device; writing information of the plurality of commands into the time queue in sequence, and writing the information of at least part of the plurality of commands into the at least one virtual queue; and selectively reading the time queue or the at least one virtual queue to read the information of the plurality of commands.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
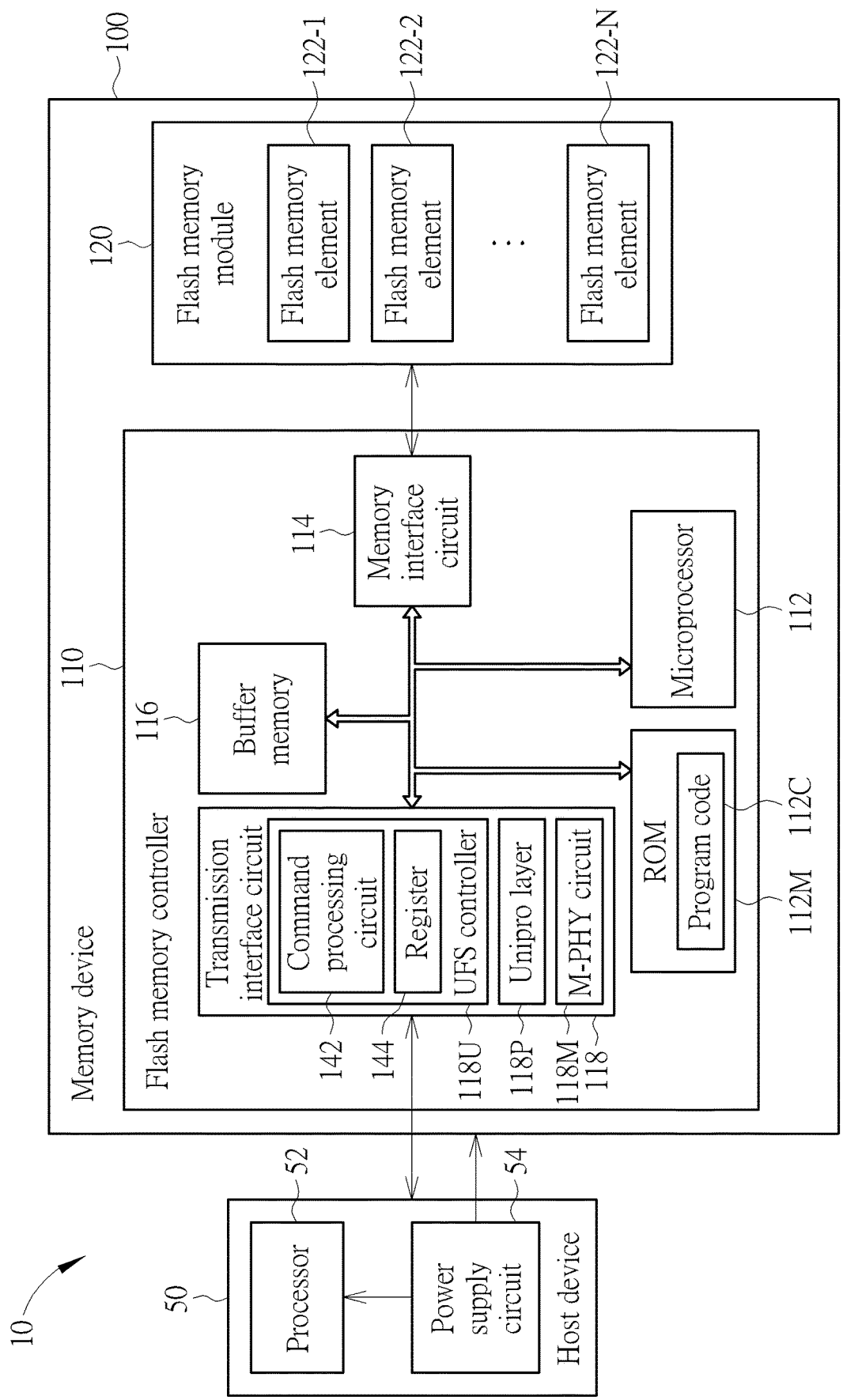
FIG. 1 is a diagram illustrating an electronic device according to one embodiment of the present invention.

FIG. 1 is a diagram illustrating an electronic device 10 according to an embodiment of the present invention, wherein the electronic device 10 may include a host device 50 and a memory device 100. The host device 50 may include at least one processor 52 and a power supply circuit 52 coupled to the processor 52. The processor 52 is arranged to control operations of the host device 50. The power supply circuit 52 is arranged to supply power to the processor 52 and the memory device 100, and output one or more driving voltages to the memory device 100. The memory device 100 may be arranged to provide storage space to the host device 50, and obtain the one or more driving voltages from the host device 50 as a power supply of the memory device 100. The host device 50 may be a multifunctional mobile phone, a wearable device, a tablet, a personal computer or other electronic product. The memory device 100 may be an embedded storage device, such as an embedded storage device conforming to the UFS specification. In this embodiment, the memory device 100 may include a flash memory controller 110 and a flash memory module 120, wherein the flash memory controller 110 is arranged to control operations of the memory device 100 and access the flash memory module 120, and the flash memory module 120 is arranged to store information. The flash memory module 120 may include at least one flash memory element (e.g. one or more flash memory chips or one or more flash memory dies), such as multiple flash memory elements 122-1, 122-2, ..., 122-N, wherein N is a positive integer greater than 1.

As shown in FIG. 1, the flash memory controller 110 may include a microprocessor 112, a read-only memory (ROM) 112M, a memory interface circuit 114, a buffer memory 116, and a transmission interface circuit 118, wherein the above components can be coupled to each other through a bus. The buffer memory 116 is implemented by a static random access memory (SRAM), and may be arranged to provide internal storage space to the memory controller 110. The ROM 112M is arranged to store a program code 112C. The microprocessor 112 is arranged to execute the program code 112C to control access of the flash memory module 120. It should be noted that, in some embodiments, the program code 112C may be stored in the buffer memory 116 or any other type of memory. In addition, the memory interface circuit 114 may include an encoder and a decoder for encoding data written into the flash memory module 120 and decoding data read from the flash memory module 120. The transmission interface circuit 118 may conform to a specific communications specification (e.g. the UFS specification), and may perform communications between the memory device 100 and the host device 50. The transmission interface circuit 118 may include a UFS controller 118U, an M-PHY circuit 118M conforming to specifications related to the MIPI Alliance, and a unified protocol (UniPro) layer 118P, wherein the above components can interact with each other, and the UFS controller 118U at least includes a command processing circuit 142 and a register 144.

In this embodiment, the host device 50 may transmit multiple commands to the flash memory controller 110, and the flash memory controller 110 may read data from the flash memory module 120 or write data into the flash memory module 120 according to the commands from the host device 50.

In this embodiment, the host device 50 transmits many different commands to the flash memory controller 110 to instruct related operations, such as read commands, write commands, task management commands, query commands and other-commands, . . . etc. The read command includes a logical address, and the read command requires the flash memory controller 110 to read data corresponding to the logical address from the flash memory module 120 and transmit the data back to the host device 50. The write command includes a logical address and corresponding data, and the write command requires the flash memory controller 110 to write the data into the flash memory module 120. The task management command is used to indicate how to process the received command, such as deleting a certain command. The query command requires the flash memory controller 110 to provide the configuration, enumeration, device description and attributes of the memory device 100 to the host device 50. The other-commands refers to all other commands that are different from the above read command, write command, task management command and query command. In addition, since the host device 50 does not classify and sort the types of commands first when transmitting commands, and some commands may need to be executed with high priority, therefore, this embodiment proposes a queue design that can efficiently process received commands.

Figure 2:
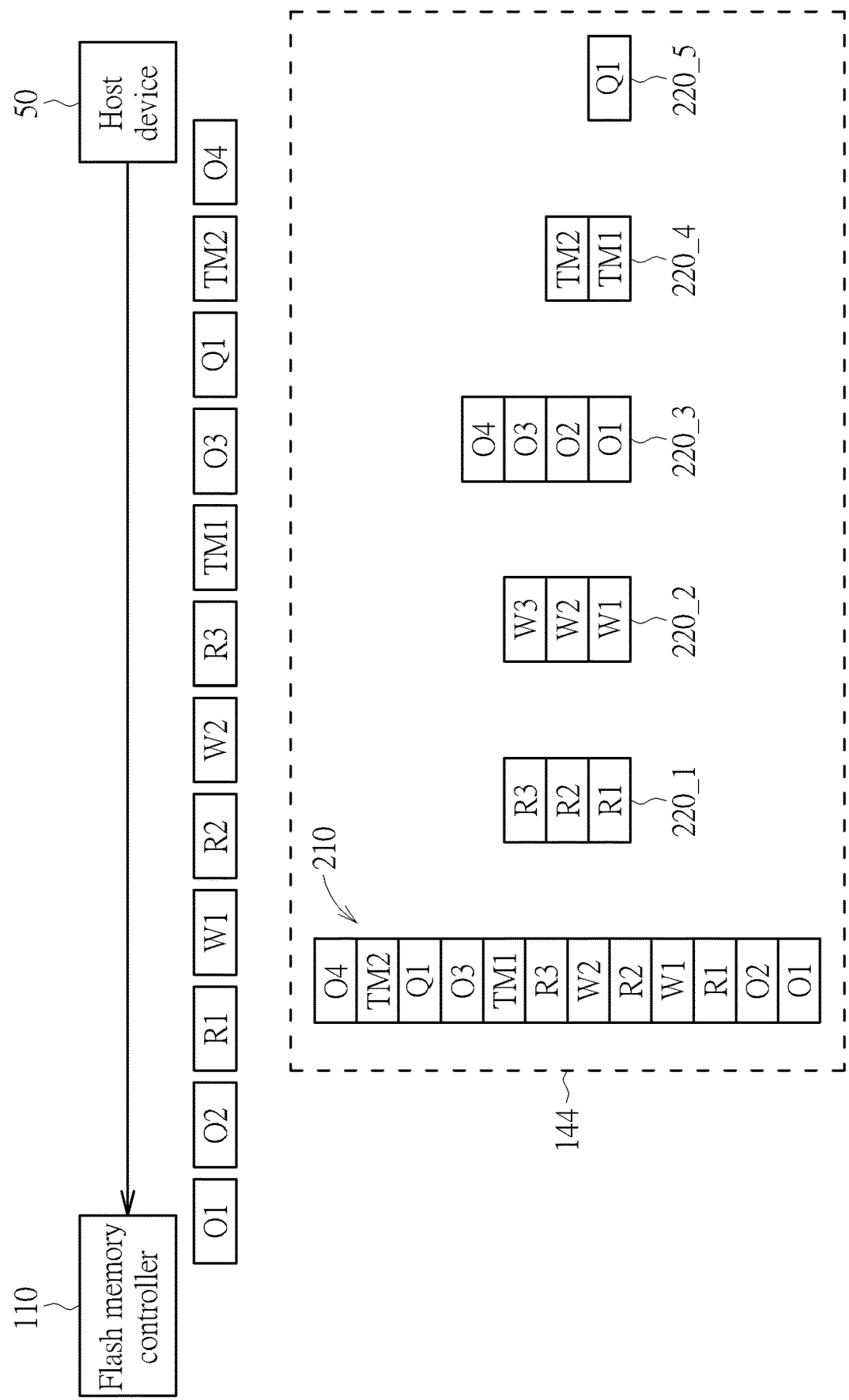
FIG. 2 is a diagram of using registers to configure a plurality of queues according to one embodiment of the present invention.

FIG. 2 is a diagram of using registers 144 to configure a plurality of queues according to one embodiment of the present invention. The registers 144 are divided into six parts, wherein the first part is used as a time queue 210, and the time queue 210 is used to store all commands from the host device 50 in sequence. Taking FIG. 2 as an example, it is assumed that the host device 50 sequentially transmits other-commands O1, O2, read command R1, write command W1, read command R2, write command W2, read command R3, task management command TM1, other-command O3, query command Q1, task management command TM2, and other-commands O4 to the flash memory controller 110. After these commands are processed by the M-PHY circuit 118M and the Unipro layer 118P, the command processing circuit 142 will temporarily store the above commands into the buffer memory 116, and store the above command information, such as the serial number of each command or the address of the command located in the buffer memory 116, in the time queue 210 is sequence. The second part of the registers 144 is used as a read command virtual queue 220_1, which is only used to store read commands received by the flash memory controller 110. In one embodiment, the read command virtual queue 220_1 stores pointer(s) to the read command(s) in the time queue 210. For example, the first data in the read command virtual queue 220_1 points to the read command R1 in the queue 210, and the second data in the read command virtual queue 220_1 points to the read command R2 in the time queue 210, and so on. The third part of the registers 144 is used as a write command virtual queue 220_2, which is only used to store write commands received by the flash memory controller 110. In one embodiment, the write command virtual queue 220_2 stores pointer(s) to the write command(s) in the time queue 210. For example, the first data in the write command virtual queue 220_2 points to the write command W1 in the queue 210, and the second data in the write command virtual queue 220_2 points to the write command W2 in the time queue 210, and so on. The fourth part of the registers 144 is used as an other-command virtual queue 220_3, which is only used to store other-commands received by the flash memory controller 110. In one embodiment, the other-command virtual queue 220_3 stores pointer(s) to the other-command(s) in the time queue 210. For example, the first data in the other-command virtual queue 220_3 points to the other-command O1 in the queue 210, and the second data in the other-command virtual queue 220_3 points to the other-command O2 in the time queue 210, and so on. The fifth part of the registers 144 is used as a task management command virtual queue 220_4, which is only used to store task management commands received by the flash memory controller 110. In one embodiment, the task management command virtual queue 220_4 stores pointer(s) to the task management command(s) in the time queue 210. For example, the first data in the task management command virtual queue 220_4 points to the task management command TM1 in the queue 210, and the second data in the task management command virtual queue 220_4 points to the task management command TM2 in the time queue 210, and so on. The sixth part of the registers 144 is used as a query command virtual queue 220_5, which is only used to store query commands received by the flash memory controller 110. In one embodiment, the task management command virtual queue 220_5 stores pointer(s) to the query command (s) in the time queue 210. For example, the query command virtual queue 220_5 points to the query command Q1 in the queue 210.

It should be noted that the sizes of the above-mentioned read command virtual queue 220_1, write command virtual queue 220_2, other-command virtual queue 220_3 and task management command virtual queue 220_4 can be determined according to the designer's considerations. That is, each virtual queue does not need to store all corresponding commands in the time queue 210. For example, the read command virtual queue 220_1 may only have one register, and the data stored in this register points to the read command R1 in the time queue 210, that is, the read command virtual queue 220_1 does not store any information of the read commands R2 and R3 in the time queue 210.

Similarly, the task management command virtual queue 220_4 can also have only one register, and the data stored in this register points to the task management command TM1 in the time queue 210, that is, the task management command virtual queue 220_4 does not store any information of the task management command TM2 in the time queue 210.

In addition, the contents of the above-mentioned read command virtual queue 220_1, write command virtual queue 220_2, other-command virtual queue 220_3, task management command virtual queue 220_4 and query command virtual queue 220_5 are synchronized with the time queue 210. That is, if the content in the time queue 210 changes, the read command virtual queue 220_1, the contents of the write command virtual queue 220_2, the other-command virtual queue 220_3, the task management command virtual queue 220_4 and the query command virtual queue 220_5 will also change accordingly. Similarly, if the contents of the read command virtual queue 220_1, the write command virtual queue 220_2, the other-command virtual queue 220_3, the task management command virtual queue 220_4 and the query command virtual queue 220_5 are changed, the content of time queue 210 will also change accordingly.

Regarding the operation of the flash memory controller 110 executing commands from the host device 50, in a normal mode or a default mode, the microprocessor 112 will periodically read the contents of the time queue 210 to determine whether the command needs to be read from the buffer memory 116 and executed. Specifically, the microprocessor 112 will read the first data (i.e., information of the earliest command) in the time queue 210, such as the information of other-command O1 shown in FIG. 2, and the microprocessor 112 reads and executes the other-command from the buffer memory 116 according to the information of the other-command O1. After executing other-command O1, the command processing circuit 142 will delete the information of other-command O1 in the time queue 210, and overwrite the other-command information in the time queue 210 forward in sequence, that is, the information of other-command O2 becomes the first data of the time queue 210, the information of the read command R1 becomes the second data of the time queue 210, . . . and so on. In addition, since the time queue 210 and other-command virtual queue 220_3 are synchronized with each other, after the information of other-commands O1 is removed from the time queue 210, the information of other-commands O1 will also be removed from the other-command virtual queues 220_3, and the information of the remaining other-commands O2-O4 will be overwritten forward in sequence. In addition, after the other-command virtual queue 220_3 removes the information of the other-command O1, since an unused register appears in the other-command virtual queue 220_3, the command processing circuit 142 will search the time queue 210 to find out whether there are other-commands that have not been recorded by other-command virtual queue 220_3, and if so, the information of this other-command is written into the last register of other-command virtual queue 220_3.

Similar to the above operations, the microprocessor 112 then sequentially processes other-command O2, read commands R1, write commands W1, . . . corresponding to the time queue 210; and the read command virtual queue 220_1, write command virtual queue 220_2, other-command virtual queue 220_3, task management command virtual queue 220_4 and query command virtual queue 220_5 are synchronized with the time queue 210 to delete relevant contents in sequence.

In addition, the microprocessor 112 can control the flash memory controller 110 to operate in one of a plurality of specific modes according to the user's settings or the control mechanism of the firmware, wherein the plurality of specific modes are used to respectively indicate the priority of at least part of the read command, write command, task management command, query command and other-command, or their execution mode (for example, execute one command or multiple commands at a time). For example, when the flash memory controller 110 operates in a specific mode, the microprocessor 112 will prioritize the execution of the contents of the query command virtual queue 220_5, that is, the microprocessor 112 will directly read the information of the query command Q1 stored in the query command virtual queue 220_5, and reads and executes the query command Q1 from the buffer memory 116 according to the information of the query command Q1. After executing the query command Q1, the command processing circuit 142 will delete the information of the query command Q1 in the query command virtual queue 220_5, and will also delete the information of the query command Q1 in the time queue 210, and the information of the commands located after the query command Q1 is overwritten forward in sequence. In addition, if there is no information about the unexecuted query command in the query command virtual queue 220_5, the microprocessor 112 will sequentially read the contents of the time queue 210.

In another embodiment, the microprocessor 112 can set the task management command to have higher priority, that is, the microprocessor 112 will directly read the information of the task management commands TM1 and TM2 in the task management command virtual queue 220_4 sequentially, and the relevant commands are read from the buffer memory 116 and executed according to the information of the task management commands TM1 and TM2.

In another embodiment, the microprocessor 112 can set a specific mode to continuously execute a large number of read commands or write commands. Specifically, the microprocessor 112 can directly read the information of multiple read commands from the read command virtual queue 220_1 at one time, or the microprocessor 112 can directly read multiple write commands from the write command virtual queue 220_2 at one time, and the information of the read/write commands are executed accordingly.

As mentioned above, when the microprocessor 112 sets a read command, a write command, a task management command, a query command or other-command to have higher execution priority, or the microprocessor 112 sets a continuous execution for a large number of read commands or write commands, the microprocessor 112 will directly read the read command virtual queue 220_1, write command virtual queue 220_2, other-command virtual queue 220_3, task management command virtual queue 220_4 or query command virtual queue 220_5 without spending a lot of time searching for relevant command information from the time queue 210. Therefore, the command processing method of this embodiment can increase execution efficiency.

In addition, the number of virtual queues shown in FIG. 2 is only used as an example, and is not a limitation of the present invention. In other embodiments, the registers 144 can be configured as more virtual queues, or the registers 144 only has part of the read command virtual queue 220_1, write command virtual queue 220_2, other-command virtual queues 220_3, task management command virtual queue 220_4 and query command virtual queue 220_5. For example, the task management command virtual queue 220_4 and the query command virtual queue 220_5 can be removed from the embodiment shown in FIG. 2, and the task management commands and the query commands can be classified as other-commands.

Figure 3:
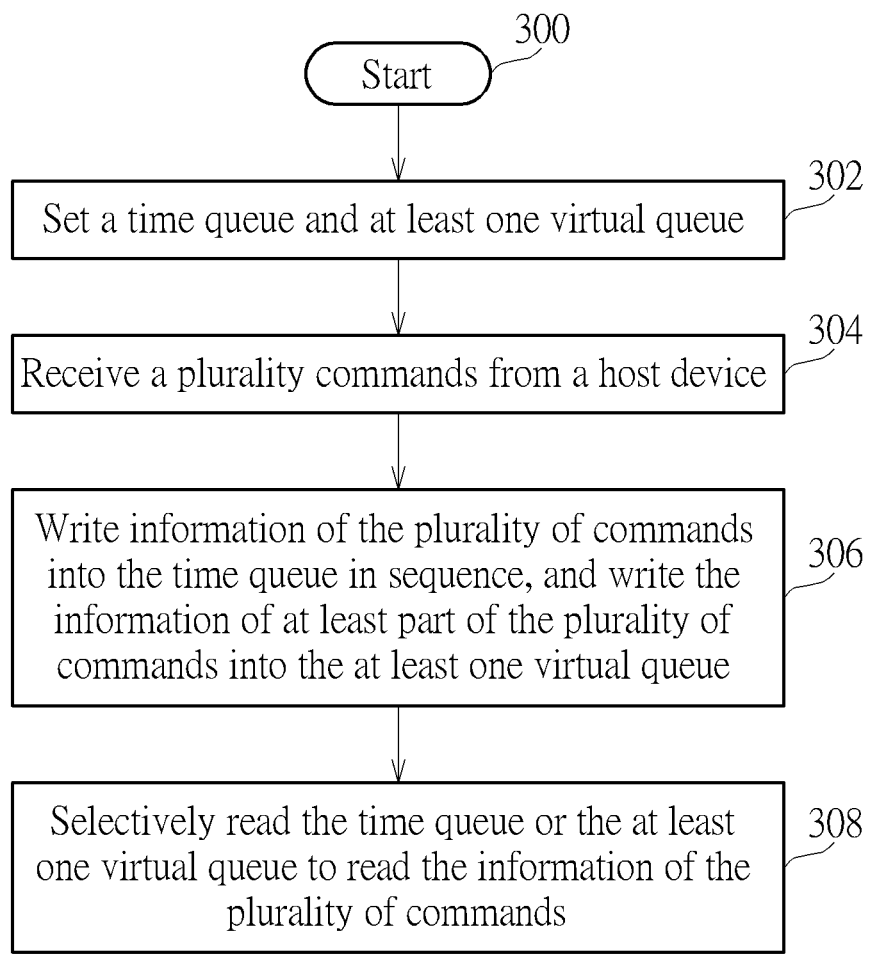
FIG. 3 is a flowchart of a control method of a flash memory controller according to one embodiment of the present invention.

FIG. 3 is a flowchart of a control method of a flash memory controller 110 according to one embodiment of the present invention. Referring to the above embodiments, the flow is described as follows.

Step 300: the flow starts.

Step 302: Set a time queue and at least one virtual queue.

Step 304: receive a plurality commands from a host device.

Step 306: write information of the plurality of commands into the time queue in sequence, and write the information of at least part of the plurality of commands into the at least one virtual queue.

Step 308: selectively read the time queue or the at least one virtual queue to read the information of the plurality of commands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller configured to access a flash memory module, wherein the flash memory controller comprises:
   a transmission interface circuit, coupled to a host device, wherein the transmission interface circuit comprises:
   a time queue;
   at least one virtual queue; and
   a command processing circuit, configured to receive a plurality commands from a host device, write information of the plurality of commands into the time queue in sequence, and write the information of at least part of the plurality of commands into the at least one virtual queue; and
   a buffer memory, configured to store the plurality of commands; and
   a microprocessor, configured to selectively read the time queue or the at least one virtual queue to read the information of the plurality of commands.

2. The flash memory controller of claim 1, wherein the at least one virtual queue comprises a read command virtual queue, and the information of the at least part of the plurality of commands comprises information of at least one read command of the plurality of commands.

3. The flash memory controller of claim 1, wherein the at least one virtual queue comprises a write command virtual queue, and the information of the at least part of the plurality of commands comprises information of at least one write command of the plurality of commands.

4. The flash memory controller of claim 1, wherein the at least one virtual queue comprises a task management command virtual queue, and the information of the at least part of the plurality of commands comprises information of at least one task management command of the plurality of commands.

5. The flash memory controller of claim 1, wherein the at least one virtual queue comprises a query command virtual queue, and the information of the at least part of the plurality of commands comprises information of a query command of the plurality of commands.

6. The flash memory controller of claim 1, wherein the information of the at least part of the commands stored in the at least one virtual queue is synchronized with the at least part of the command information stored in the time queue.

7. The flash memory controller of claim 6, wherein when the flash memory controller operates in a normal mode or a default mode, the microprocessor sequentially reads the information of the plurality of commands from the time queue; and for the information of each command, after the microprocessor executes the corresponding command, the microprocessor deletes the information of the command in the time queue, and also deletes the information of the command in the at least one virtual queue simultaneously.

8. The flash memory controller of claim 7, wherein when the flash memory controller operates in a specific mode, the microprocessor sequentially reads the information of the at least part of the commands from the at least one virtual queue; and for the information of each command, after the microprocessor executes the corresponding command, the microprocessor deletes the information of the command in the at least one virtual queue, and also deletes the information of the command in the time queue simultaneously.

9. A control method of a flash memory controller, comprising:
   setting a time queue and at least one virtual queue;
   receiving a plurality commands from a host device;
   writing information of the plurality of commands into the time queue in sequence, and writing the information of at least part of the plurality of commands into the at least one virtual queue; and
   selectively reading the time queue or the at least one virtual queue to read the information of the plurality of commands.

10. The control method of claim 9, wherein the at least one virtual queue comprises a read command virtual queue, and the information of the at least part of the plurality of commands comprises information of at least one read command of the plurality of commands.

11. The control method of claim 9, wherein the at least one virtual queue comprises a write command virtual queue, and the information of the at least part of the plurality of commands comprises information of at least one write command of the plurality of commands.

12. The control method of claim 9, wherein the at least one virtual queue comprises a task management command virtual queue, and the information of the at least part of the plurality of commands comprises information of at least one task management command of the plurality of commands.

13. The control method of claim 9, wherein the at least one virtual queue comprises a query command virtual queue, and the information of the at least part of the plurality of commands comprises information of a query command of the plurality of commands.

14. The control method of claim 9, wherein the information of the at least part of the commands stored in the at least one virtual queue is synchronized with the at least part of the command information stored in the time queue.

15. The control method of claim 14, wherein the step of selectively reading the time queue or the at least one virtual queue to read the information of the plurality of commands comprises:
   when the flash memory controller operates in a normal mode or a default mode, sequentially reading the information of the plurality of commands from the time queue; and
   for the information of each command, after the corresponding command is executed, deleting the information of the command in the time queue, and also deleting the information of the command in the at least one virtual queue simultaneously.

16. The control method of claim 15, wherein the step of selectively reading the time queue or the at least one virtual queue to read the information of the plurality of commands comprises:
- when the flash memory controller operates in a specific mode, sequentially reading the information of the at least part of the commands from the at least one virtual queue; and
- for the information of each command, after the corresponding command is executed, deleting the information of the command in the at least one virtual queue, and also deleting the information of the command in the time queue simultaneously.

\* \* \* \* \*